United States Patent
Thomas (10) Patent No.: US 9,379,442 B2
(45) Date of Patent: Jun. 28, 2016

(54) ANTENNA FOR A MOIST ENVIRONMENT

(75) Inventor: Thierry Thomas, Varces Allieres Et Risset (FR)

(73) Assignee: Commissariat a l'energie atomique et aux energies alternatives (FR)

( * ) Notice: Subject to any disclaimer, the term of this patent is extended or adjusted under 35 U.S.C. 154(b) by 578 days.

(21) Appl. No.: 13/704,576

(22) PCT Filed: Jun. 14, 2011

(86) PCT No.: PCT/FR2011/051345
§ 371 (c)(1),
(2), (4) Date: Feb. 27, 2013

(87) PCT Pub. No.: WO2011/157941
PCT Pub. Date: Dec. 22, 2011

(65) Prior Publication Data
US 2013/0271343 A1    Oct. 17, 2013

(30) Foreign Application Priority Data
Jun. 15, 2010 (FR) ...................... 10 54727

(51) Int. Cl.
*H01Q 21/00* (2006.01)
*H01Q 7/00* (2006.01)
(Continued)

(52) U.S. Cl.
CPC ............ *H01Q 7/00* (2013.01); *G06K 19/07766* (2013.01); *H01Q 1/04* (2013.01); *H01Q 1/2225* (2013.01)

(58) Field of Classification Search
CPC ....................................................... H01Q 7/00
USPC ......................................................... 343/867
See application file for complete search history.

(56) References Cited

U.S. PATENT DOCUMENTS 5,258,766 A    11/1993  Murdoch
6,771,227 B2    8/2004  Tsai et al.
(Continued)

FOREIGN PATENT DOCUMENTS

CN    1190496 A    8/1998
CN    1359167 A    7/2002
(Continued)

OTHER PUBLICATIONS

Maro Kooppe, "International Application No. PCT/FR2011/051345 Search Report", Oct. 7, 2011, Publisher: EPO.
(Continued)

*Primary Examiner* — Graham Smith
(74) *Attorney, Agent, or Firm* — Kaplan Breyer Schwarz & Ottesen LLP (57) ABSTRACT

The invention relates to an inductive antenna, comprising: a first planar conductive winding (42) on a first surface of a substrate, said first winding being cut off at regular intervals so as to form a series of pairs of first conductors (522, 524; 542, 546; 562, 564); and a second planar conductive winding (44) on a second surface of the substrate, said second winding being provided opposite the first winding and cut off in a direction vertically perpendicular to that of the cutoffs of the first winding so as to form a series of pairs of second conductors (526, 528; 546, 548; 66, 568). Each pair of first conductors defines a resonant subassembly with the pair of second conductors opposite thereto, wherein each of the two first conductors of a single subassembly are electrically connected to another first conductor of another subassembly or to a terminal (41, 43) of the antenna, the second conductors of adjacent pairs are not electrically connected to each other, and one end (5224, 244, 5424, 5444, 5624, 5644) of each first conductor is either electrically connected (523, 543, 563, 525, 545, 565) to one end (5284, 5264, 5484, 5464, 5684, 5664) of a second conductor of the subassembly in question or is not connected thereto, in which case the second conductors of the subassembly in question are electrically connected to one another.

16 Claims, 4 Drawing Sheets

(51) Int. Cl.
*G06K 19/077* (2006.01)
*H01Q 1/04* (2006.01)
*H01Q 1/22* (2006.01)

(56) References Cited

U.S. PATENT DOCUMENTS

| | | | |
|---|---|---|---|
| 6,847,210 | B1 | 1/2005 | Eydelman et al. |
| 2003/0080918 | A1 | 5/2003 | Forster |
| 2003/0231020 | A1 | 12/2003 | Yonezawa et al. |
| 2013/0207857 | A1 | 8/2013 | Thomas |

FOREIGN PATENT DOCUMENTS

| | | | |
|---|---|---|---|
| CN | 101582537 | A | 11/2009 |
| DE | 3140319 | A1 | 4/1983 |
| EP | 1675212 | A1 | 6/2006 |
| JP | S4415243 | Y1 | 7/1969 |
| JP | 2004336198 | A | 11/2004 |
| WO | 2005029633 | A1 | 3/2005 |
| WO | 2007084510 | A1 | 7/2007 |
| WO | 2008083719 | A1 | 7/2008 |

OTHER PUBLICATIONS

Garcia-Garcia J et al, "On the Resonances and Polarizabilities of Split Ring Resonators", Aug. 10, 2005, pp. 33103-033103, vol. 98, No. 3, 10, Publisher: Journal of Applied Physics, American Institute of Physics, Published in: New York, US, XP12078207A.

"Office Action," dated May 4, 2015, issued in counterpart Chinese Application No. 2011-80038901.4.

"Office Action", issued in related Chinese Patent Application No. 201180039130.0 dated Apr. 3, 2014 (foreign counterpart of related U.S. Appl. No. 13/704,566).

"Written Opinion" issued in related International Patent Application No. PCT/FR2011/051346 (International counterpart of related U.S. Appl. No. 13/704,566).

Paul H. Duncan, "Analysis of the Moebius Loop Magnetic Field Sensor", "IEEE Transactions on Electromagnetic Compatibility", May 1, 1974, pp. 83-89, vol. EMC-10, No. 2, Publisher: IEEE, Published in: New York, US.

Peter Kruck, "International Search Report", issued in related International Application No. PCT/FR2011/051346, Sep. 19, 2011 (International counterpart of related U.S. Appl. No. 13/704,566).

Non-Final Office Action issued in related U.S. Appl. No. 13/704,566, dated Jun. 29, 2015.

Notice of Allowance issued in related U.S. Appl. No. 13/704,566, dated Jan. 11, 2016.

ANTENNA FOR A MOIST ENVIRONMENT

FIELD OF THE INVENTION

The present invention generally relates to antennas and, more specifically, to the forming of a high-frequency inductive antenna.

The invention more specifically applies to antennas intended for radio frequency transmissions of several MHz in a moist environment, for example, for contactless chip card, RFID tag, or electromagnetic transponder transmission systems.

DISCUSSION OF THE RELATED ART

Figure 1:
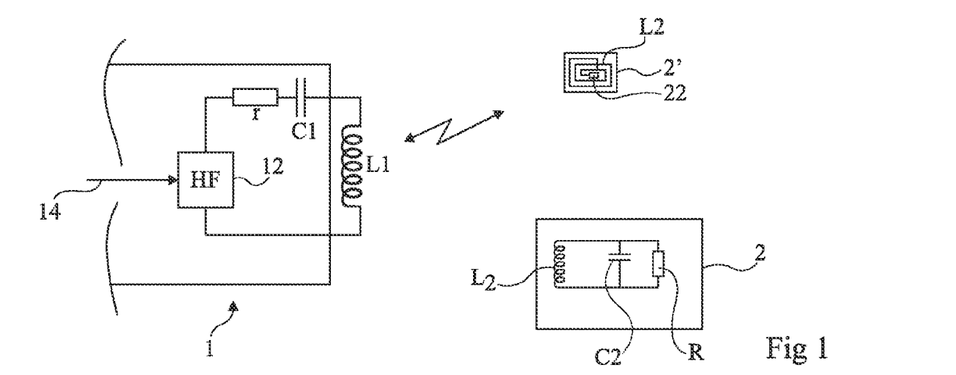
FIG. 1, previously described, schematically shows in the form of blocks an example of a radio frequency transmission system to which the present invention applies.

FIG. 1 very schematically shows an example of a radio frequency transmission system of the type to which the present invention applies as an example.

Such a system comprises a reader or base station 1 generating an electromagnetic field capable of being detected by one or several transponders 2 located in its field. Such transponders 2 for example are an electronic tag 2' placed on an object for identification purposes or more generally any electromagnetic transponder (symbolized by a block 2 in FIG. 1).

On the side of reader 1, a resonant inductive antenna is generally symbolized by a series resonant circuit formed of a resistor r, of a capacitor C1, and of an inductive element L1 or antenna. This circuit is excited by a high-frequency generator (HF) controlled (connection 14) by other circuits not shown of base station 1. A high-frequency carrier is generally modulated (in amplitude and/or in phase) to transmit data to the transponder.

On the side of transponder 2, a resonant circuit, generally parallel, comprises an inductive element or antenna L2 in parallel with a capacitor C2 and with a load R standing for electronic circuits 22 of transponder 2. This resonant circuit detects the flow of the high-frequency magnetic field generated by the base station when it is submitted to this field. In the case of an electronic tag 2', inductive element L2 is formed of a conductive winding connected to an electronic chip 22. The chip generally encloses capacitor C2.

The symbolic representation in the form of a series resonant circuit on the base station side and of a parallel resonant circuit on the transponder side is usual even if, in practice, one may find series resonant circuits on the transponder side and parallel resonant circuits on the base station side. On the base station side, one may also find a resonant LC structure where the capacitance is split into a parallel portion and a series portion. This enables to add an impedance variation function, for example, to match the impedance with the generator.

Transponders generally have no autonomous power supply and recover the power necessary to their operation from the magnetic field generated by base station 1. They transmit data to the station by modifying the load (R) applied to their resonant circuit to modulate the current flowing in their inductive antenna L2 and resulting from the electromagnetic force induced by the magnetic field of the base station.

The resonant circuits of the reader and of the transponder are generally tuned to a same resonance frequency $\omega$ ($L1.C1.\omega^2 = L2.C2.\omega^2 = 1$). When the transponder is placed in an environment such as air, the electric permittivity of the medium surrounding the transponder is practically that of vacuum ($\in_0 = 8.854 \cdot 10^{-12}$ Farad per meter, or relative permittivity $\in_r = 1$). The characteristics of the resonant circuit of the transponder (frequency tuning, quality factor) are stable and at their nominal values. However, this is not true in soil (or in any other moist environment) where the variable quantity of water causes a high variability of the electric permittivity of the environment surrounding the transponder, up to very high values. Water has a very high relative electric permittivity $\in_r$, of approximately 80. If the resonant circuit of the transponder is not sufficiently protected by an envelope of a material of stable low electric permittivity, the characteristics of the resonant circuit of the transponder will be strongly altered. If the electric permittivity of the protection envelope that may possibly be used is not low, the characteristics of the resonance circuit in the presence of this envelope may be adjusted, provided for this permittivity to be stable.

Figure 2:
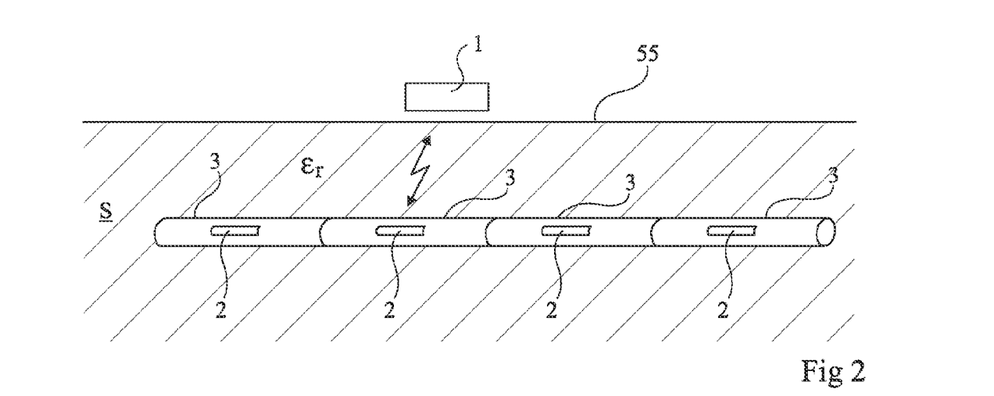
FIG. 2, previously described, is a simplified representation of an installation to which the present invention more specifically applies.

FIG. 2 very schematically shows an example of a system of transmission in a moist environment. This system is meant to detect pipes 3 buried in soil S. A base station forming a detector is placed close to surface 55 of soil S. Such a detector emits a radio frequency magnetic field capable of being detected by transponders 2 associated with pipes 3 buried in the soil. Such a system is generally used to detect the presence of ducts in civil engineering works.

A problem in this type of application is that the soil forms a moist environment capable of varying from a dry soil to a water-saturated soil. Electric permittivity $\in_r$ (capable of reaching several tens) is then no longer of the same order of magnitude as in air ($\in_r = 1$). As a result, stray capacitances formed between different portions of the inductive circuit (L2) of the transponder antenna are strongly increased, which adds dielectric losses to the resonator. The resonant circuit of the transponder is then no longer tuned and its quality factor is negatively altered, which adversely affects the transmission (remote-supply and communication).

Current solutions comprise coating the resonant circuit of the transponder with an insulating material (permittivity $\in_r$ on the order of 1 or ranging up to several units (<5)) which is thick enough for the moist environment to be sufficiently distant and to no longer interfere with the characteristics of the transponder resonator. It is also possible to adjust the resonator characteristics in the presence of the protection material. Although the necessary thickness (in practice, a few millimeters) may seem low, it considerably increases the pipe cost. For other applications, the thinness of the transponder used as a tag may also be a constraint which makes a thickness increase undesirable.

In particular, in order to locate the path of a duct, tags should be present at small intervals ranging from less than one meter to a few meters.

Further, it is not desirable for ducts to have large outgrowths (package integrating the transponder, for example).

On the internal side, even if the pipe is intended to convey liquid, the tube thickness is generally sufficient for the resonator characteristics not to be disturbed.

Figure 3:
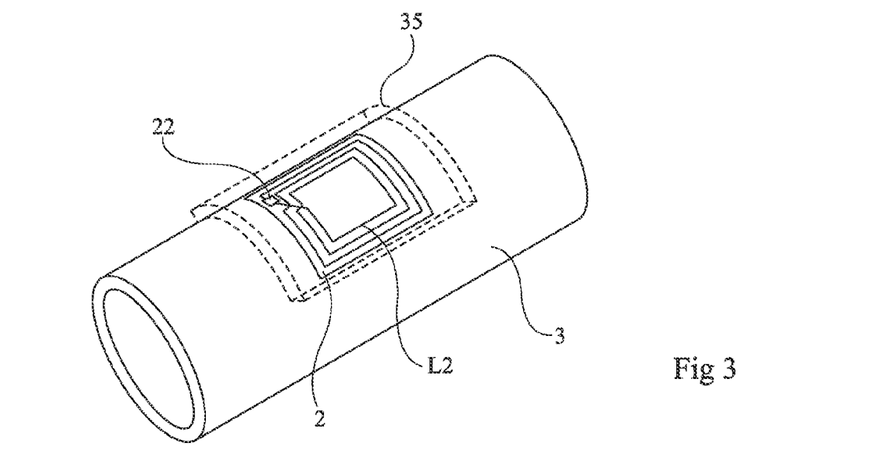
FIG. 3, previously described, is a simplified perspective view, partially in cross-section, of a known technique.

FIG. 3 is a perspective view, partially in cross-section, of an example of a known technique for making an electronic tag usable in a moist environment having a moisture content ranging from dry to water-saturated.

A tag 2 comprising an electronic chip 22 and a planar antenna L2 is placed on the external surface of pipe 3. The tag is supported by an insulating sheet, which is flexible so that it can be wrapped around the pipe. Then, the assembly is covered with a flexible insulating layer 35, for example, rectangular. Even with materials of very low permittivity (equal to or slightly greater than one in relative value), the added thickness remains greater than several millimeters.

It could be envisaged to embed the tags in the pipe thickness on manufacturing. However, this makes the pipe manufacturing more complex, and thus more expensive. The insertion of an object in the thickness may impose strong manufacturing constraints to maintain/save the mechanical resistance of the pipe.

There thus is a need for an inductive antenna adapted to moist environments.

Document WO 2008/083719 describes a small antenna formed of a first circular track interrupted at one point and surrounded with a second track interrupted in two diametrically opposed positions. The first and second tracks do not each form a winding, in the sense of a geometrical figure equivalent to a winding of at least two conductive track turns.

Document US 2003/080918 describes a wireless communication device and provides associating pressure and temperature sensors with this device.

Document WO 2007/084510 describes various forms of RFID antennas, including a circular ring antenna formed of discontinuous non-interconnected sections.

Article "On the resonances and polarizabilities of split ring resonators" by Garcia et al., published in the Journal of Applied Physics, American Institute of Physics, August 2005 (vol. 98, n° 3, pages 033103-1 to 9, describes different forms of resonant circuits formed of pairs of tracks.

Document JP 2004-336198 describes a loop antenna of several turns with no electric discontinuity.

SUMMARY

An object of an embodiment of the present invention is to provide an inductive antenna which overcomes all or part of the disadvantages of conventional antennas.

Another object of an embodiment of the present invention is to provide an antenna which is particularly well adapted to uses in moist environments.

Another object of an embodiment of the present invention is to provide an inductive antenna of low thickness (thickness smaller than one millimeter), requiring no additional insulator in a moist environment.

An object of an embodiment of the present invention is to provide a solution requiring no modification of the transponder support.

To achieve all or part of these and other objects, the present invention provides an inductive antenna comprising:

an insulating substrate;

a first planar conductive winding on a first surface of the substrate, interrupted at regular intervals to form a series of pairs of first conductive tracks;

a second planar conductive winding on a second surface of the substrate facing the first winding, the interruptions in the second winding facing the interruptions in the first winding to form a series of pairs of second conductive tracks; and wherein:

each pair of first tracks defines, with the facing pair of second tracks, a resonant subassembly;

the first two tracks of a same subassembly are not interconnected and are each electrically connected to one and only one other first track of another subassembly or to a terminal of the antenna;

the second tracks of neighboring pairs are not electrically interconnected; and one end of each first track is:

electrically connected to one end of a second track of the concerned subassembly; or unconnected, the second tracks of the concerned subassembly being then electrically interconnected.

According to an embodiment of the present invention, the substrate is flexible.

According to an embodiment of the present invention, the antenna has a thickness smaller than 1 millimeter.

According to an embodiment of the present invention, the antenna comprises at least two subassemblies.

According to an embodiment of the present invention, the antenna further comprises a half-subassembly formed of a first track opposite to a second track and coupled to at least one subassembly.

The present invention also provides a resonator comprising an antenna having interconnected terminals.

The present invention also provides an electronic tag adapted to moist environments, comprising an electronic circuit connected to an antenna.

According to an embodiment of the present invention, a matching circuit comprising at least one inductive element and one capacitive element is interposed between the antenna and the electronic circuit.

The present invention also provides a duct comprising at least one electronic tag.

The present invention also provides a package comprising at least one electronic tag.

The present invention also provides an electromagnetic transponder comprising an electronic tag and a sensor connected to the electronic circuit.

The present invention also provides the use of a tag in the ground.

The present invention also provides a duct comprising at least one resonator.

The present invention also provides a package comprising at least one resonator.

The present invention also provides an electromagnetic transponder comprising at least one resonator and a sensor connected to the electronic circuit.

The present invention also provides the use of a resonator in the ground.

BRIEF DESCRIPTION OF THE DRAWINGS

The foregoing and other objects, features and advantages of the present invention will be discussed in detail in the following non-limiting description of specific embodiments in connection with the accompanying drawings, among which.

DETAILED DESCRIPTION

The same elements have been designated with the same reference numerals in the different drawings, which have been drawn out of scale. For clarity, only those elements which are useful to the understanding of the present invention have been shown and will be described. In particular, the base stations for which the transponder antennas which will be described are intended have not been detailed, the invention being compatible with the various current base stations and detectors and requiring no modification thereof. Further, the modulation signals of the load formed by the transponder have not been detailed either, the invention being compatible with signals currently used for this type of transponders. The invention is further compatible with electronic tags currently available for this type of transponders.

To make the tuning of the tag insensitive to the moist environment in which it is stuck, it is provided to increase the capacitive value of its resonant circuit. Thus, the stray capacitances present between the different circuit portions and dependent on the environment permittivity only bring, even with a high permittivity, a negligible contribution to the tuning of the resonant circuit. A difficulty then is to decrease the inductance value necessary to compensate for the capacitance increase for a given resonance frequency (in applications more specifically targeted by the present invention, between 10 and 100 MHz). To decrease the inductance, it could have been devised to decrease the number of turns of planar windings forming the antenna (the inductance varies as the square of the number of turns). However, decreasing the number of turns also decreases the voltage recovered across the antenna (the recovered voltage varies as the number of turns). Now, the recovered voltage must be sufficient to extract the power necessary for the operation of the tag chip.

It could have been devised to increase the format of the inductance (the recovered voltage varies as the square of the scale factor) while decreasing the number of turns (the inductance varies as the scale factor). However, the antenna size which would then be necessary would often be incompatible with the application.

Further, the thickness constraint prevents the use of discrete components, which may be necessary, especially to incorporate a capacitive element of high value.

It is thus provided to split the circuit of the resonant inductive antenna into subassemblies or into pairs of sections interconnected in a specific way to form resonant subassemblies all having the same resonance frequency, each subassembly having a sufficiently low inductance value for the capacitive element taking part in the concerned subassembly to have a value sufficient to make stray capacitances depending on the moist environment permittivity negligible, even with a high permittivity.

In a simplified embodiment, the terminals of the resonant antenna thus formed are directly interconnected. A simple resonator having frequency tuning and quality factor characteristics which are not negatively altered by a moist environment is thus obtained, such a resonator being capable of responding to simple marking applications.

In an embodiment capable of working with an electronic chip, it may be necessary to interpose a matching circuit between the inductive resonant antenna and the electronic chip.

Figure 4:
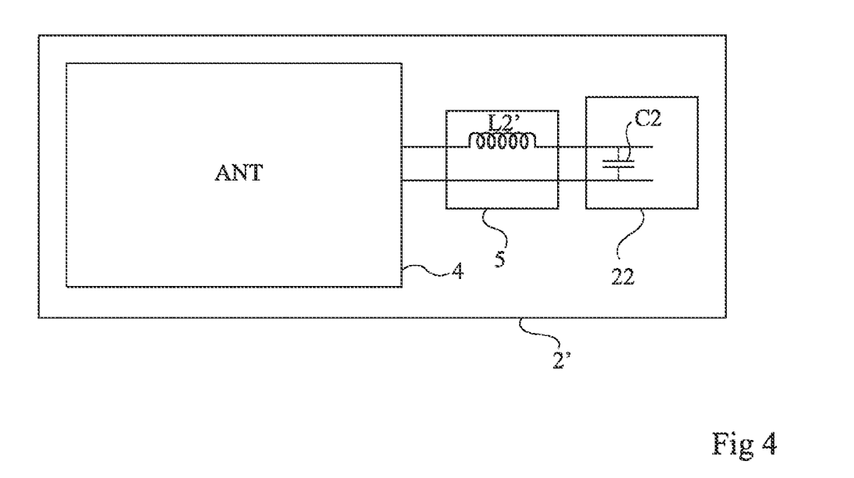
FIG. 4 is a block diagram of an embodiment of a transponder according to the present invention.

FIG. 4 is a block diagram of such an embodiment.

A resonator 4 (ANT) formed of resonant subassemblies, examples of which will be described hereafter, is connected to an electronic chip 22 via a matching circuit 5. Such a matching circuit is for example formed of an inductance (for example, a planar inductive winding) in series with the resonator windings. A capacitive element C2 takes part in the matching but may be integrated in chip 22, as shown. Element C2 is in parallel with the electronic circuits of chip 22. Inductance L2' is preferentially of small size as compared with resonant inductive antenna 4. Inductive element L2' is selected so that circuit L2'C2 is tuned to the frequency of the radio frequency field, to obtain an overvoltage effect. Inductive element L2', which does not need to recover a voltage induced by the radio frequency magnetic field, will preferably be selected to have a small size, whereby the disturbances introduced by the moist environment on the resonance characteristics of circuit L2'C2 only slightly influence the tag operation. In the following description, term "antenna" will designate resonant inductive antenna 4.

Figure 5:
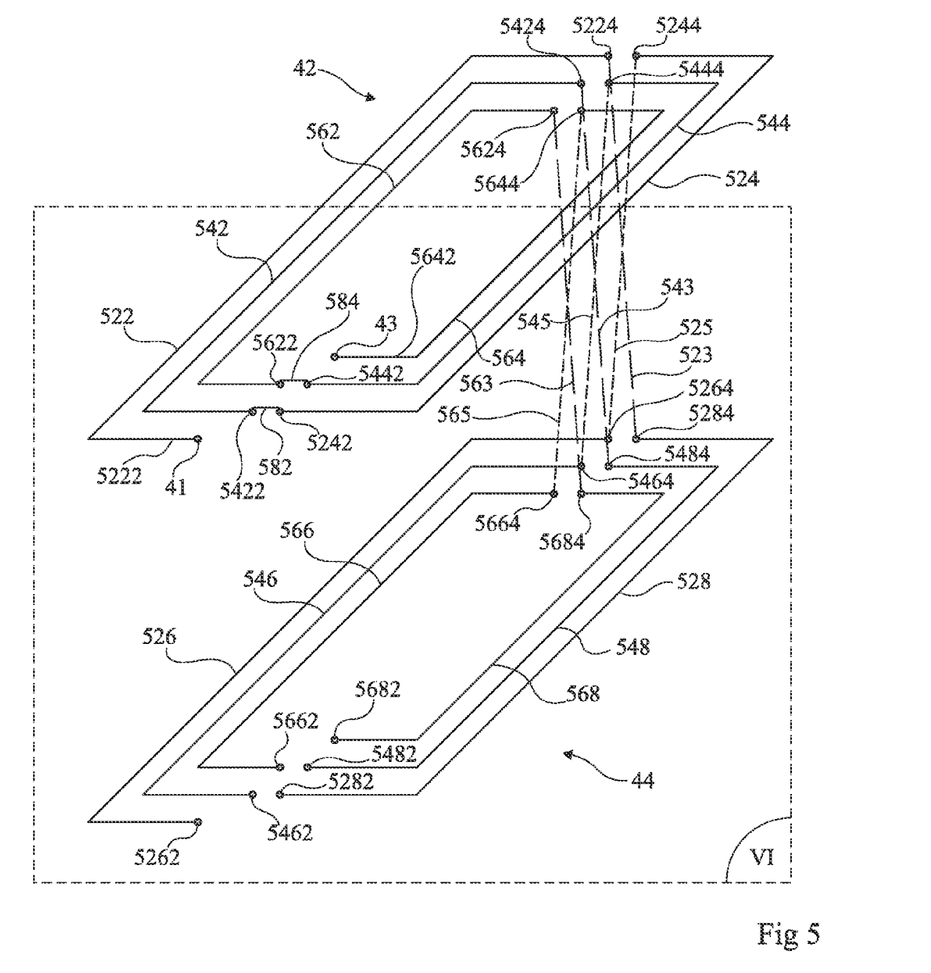
FIG. 5 is a perspective view of an antenna according to an embodiment of the present invention.

FIG. 5 is a simplified perspective view of an embodiment of an antenna 4 for a transponder 2' in a moist environment.

Figure 6:
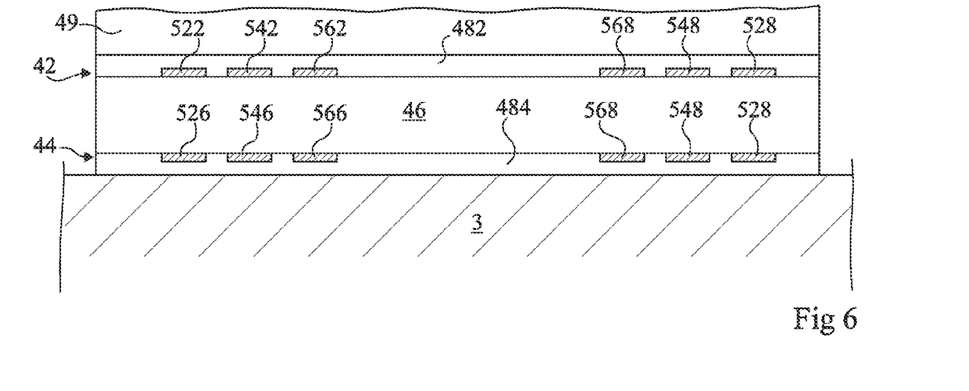
FIG. 6 is a cross-section view along plane VI of FIG. 5.

FIG. 6 is a cross-section view along plane VI of FIG. 5.

Antenna 4 is formed of two identical planar conductive windings 42 and 44 on the two surfaces of an insulating substrate 46. The windings are placed vertically above each other. The substrate is, for example, a flexible insulating sheet of the type currently used for planar antennas. The windings are interrupted, preferably at regular intervals, to form on each surface of the substrate an assembly of stacked identical conductive tracks forming micro-strip line sections, such microstrip line sections being contiguously gathered by two according to the layout of the windings forming resonant subassemblies.

Term "winding" is used to designate a geometrical figure equivalent to a winding of at least two conductive track turns.

When speaking of a planar winding or of a planar antenna, this does not exclude for the substrate to be flexible so that, in the end, the antenna takes the shape of the device (for example, the pipe) on which it is placed.

In a same resonant subassembly, the conductive tracks of the two line sections are connected to the geometrical point of continuity according to the layout of the windings according to two embodiments which will be discussed hereafter. The resonant subassemblies are interconnected according to the layout of the windings between one end of a first subassembly connected to a terminal 41 of antenna 4 and one end of a last subassembly connected to a terminal 43 of antenna 4. The connections are performed by means of electric connections on a same surface or of through electric connections from one surface to the other (vias).

According to the embodiment of FIG. 5, the antenna is formed of three resonant subassemblies (which are respectively identified by the two first digits 52, 54, and 56 of the reference numerals) of two microstrip line sections forming an assembly of four conductive tracks, each subassembly comprising two first tracks 522, 524, 542, 544, 562, 564 on the first surface of the substrate opposite to two second tracks 526, 528, 546, 548, 566, 568 on the second surface. The first microstrip line sections of each subassembly are respectively formed of track pairs 522 and 526, 542 and 546, 562 and 566, and the second sections are formed of track pairs 524 and 528, 544 and 548, 564 and 568. The two tracks of a same resonant subassembly and of a same surface are geometrically one after the other in the corresponding winding 42 or 44.

Thus, a first terminal 41 of antenna 4 is connected to a first end 5222 of a track 522 (for example, arbitrarily forming a half-loop) having its second end 5224 facing, without being connected thereto, a second end 5244 of a track 524 of a first subassembly 52. Track 524 continues winding 42 and is connected (connection 582), by its first end 5242, to first end 5422 of a track 542 of second subassembly 54. This structure is repeated all along first winding 42. Thus, a first end 5622 of a track 562 of third subassembly 56 is electrically connected (connection 584) to end 5442 of track 544 of subassembly 54. A second end 5624 of track 562 faces (without being connected thereto) second end 5644 of a track 564 of subassembly 56. A first end 5642 of track 564 ends the winding by a connection to a second terminal 43 of the antenna.

On the second surface side, an identical pattern is repeated with second tracks 526, 528, 546, 548, 566, and 568 of subassemblies 52, 54, and 56. The first respective terminals 5262, 5462, 5662, 5282, 5482, and 5682 of tracks 526, 546, 566, 528, 548, and 568 are however left floating.

In the embodiment of FIG. 5, second respective ends 5224, 5424, and 5624 of tracks 522, 542, and 562 of first winding 42 are connected (for example, by vias, respectively 523, 543, and 563) to second respective ends 5284, 5484, and 5684 of tracks 528, 548, and 568 of the corresponding subassembly, formed in second winding 44. Second respective ends 5244, 5444, and 5644 of tracks 524, 544, and 564 of first winding 42 are connected to second respective ends 5264, 5464, and 5664 of tracks 526, 546, and 566 of the corresponding subassembly, formed in second winding 44.

As a variation, connections 582 and 584 are on winding 44 (respectively connecting ends 5462 and 5282 and ends 5662 and 5482) and second ends 5422, 5622, 5242, and 5442 of tracks 542, 524, 562, and 544 are left floating. In this variation, the terminals of the antenna then correspond to ends 5262 and 5682 of tracks 526 and 568.

Both surfaces are covered with an insulating varnish 482, 484 (FIG. 6), after an electronic circuit (chip 22) has been arranged thereon, possibly with an interposed matching circuit 5. The assembly can then be arranged (for example glued) on the external surface of pipe 3. Finally, an insulating film 49 is arranged on the assembly.

It can be considered that each resonant track subassembly 52, 54, 56 represents a Moebius-type connection between two line sections (see, for example, article "Analysis of the Moebius Loop Magnetic Field Sensor" by P. H. Duncan, published in IEEE Transaction on Electromagnetic Compatibility, May 1974 which describes a Moebius-type connection with two coaxial line sections). The different resonant subassemblies are then geometrically arranged end to end in an involute shape, the electric connection between two adjacent subassemblies being preferably performed in a single conductive level. There is no electric continuity via a same subassembly between the two electric connections which connect this subassembly to the adjacent subassemblies or to terminals 41, 43 of antenna 4.

Figure 7:
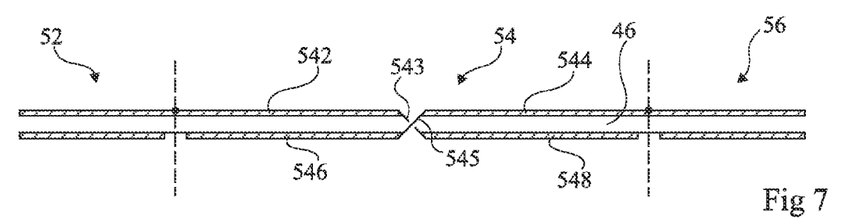
FIG. 7 is a simplified cross-section view of a first type of subassembly of an antenna according to the present invention.

FIG. 7 is a cross-section view of one of the subassemblies (for example, resonant subassembly 54) of FIG. 5 in an unwound representation.

Figure 7A:
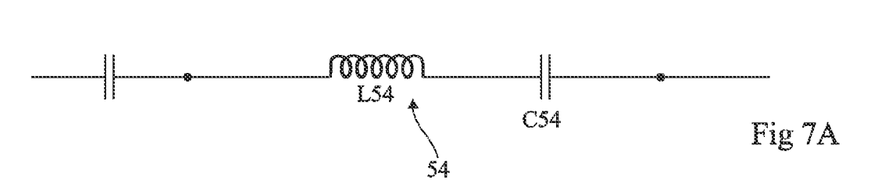
FIG. 7A shows the equivalent electric diagram of the subassembly of FIG. 7.

FIG. 7A shows the equivalent electric diagram of subassembly 54 of FIG. 7.

Each first track 542 or 544 formed in the first conductive level or winding is connected, by its second end and by connection 543, respectively 545, to second track 548 or 546 vertically above the other first track in the other level or winding (crossed connection). The first ends of tracks 542 and 544 define terminals of access to the subassembly, respectively connected to the access terminals of adjacent subassemblies 52 and 56. The first ends of tracks 546 and 548 are left floating.

From an electric viewpoint and as illustrated in FIG. 7A, the equivalent electric diagram of such a subassembly amounts to electrically arranging, in series, an inductance of value L54 and a capacitor of value C54. Inductance L54 represents the inductance of a single conductive track equivalent to the association of the conductive tracks of subassembly 54, plus the mutual inductances between this equivalent track and the equivalent tracks associated in the same way with the other subassemblies. Capacitor C54 represents the capacitance formed by the tracks of subassembly 54 between tracks 542 and 544 of the first level and tracks 546 and 548 of the second level (taking into account the electric permittivity of insulating substrate 46). The different resonant circuits are electrically series-connected to form the antenna.

The impedance of resonant subassembly 54 is, in this embodiment (neglecting ohmic losses in the conductive tracks and dielectric losses), $Z = jL54\omega + 1/jC54\omega$.

Figure 8:
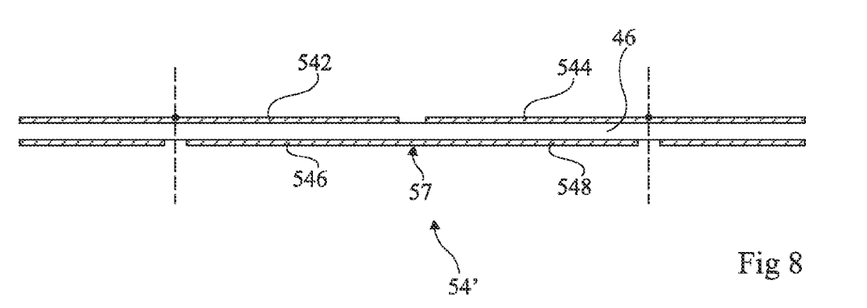
FIG. 8 is a simplified cross-section view of a second type of subassembly of an antenna according to an embodiment of the present invention.

FIG. 8 is a cross-section view of a subassembly according to a second embodiment.

According to this second embodiment, the second respective ends of tracks 542 and 544 of the first winding are left floating (unconnected) and the second respective ends of tracks 546 and 548 of the second winding of a same subassembly are interconnected (connection 57). The rest is not modified with respect to the first embodiment.

Figure 8A:
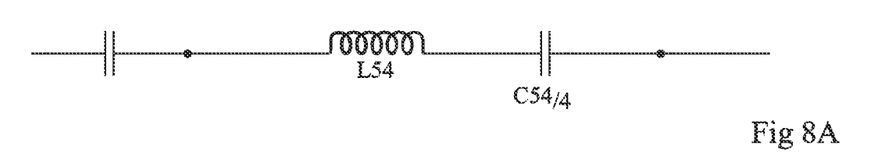
FIG. 8A shows the equivalent electric diagram of the subassembly of FIG. 8.

From an electric viewpoint and as illustrated in FIG. 8A, assuming that the tracks are of same length in the two embodiments, the embodiment of FIGS. 8 and 8A amounts to a series connection of an inductive element of value L54 with a capacitive element of value C54/4, where L54 and C54 represent the inductances and capacitances of subassembly 54 defined in relation with FIG. 7A.

The impedance of a pair of sections in this embodiment is (neglecting ohmic losses in the conductive tracks and dielectric losses), $Z = jL54\omega + 1/j(C54/4)\omega$ This embodiment decreases the equivalent capacitance but avoids interconnection vias in each subassembly.

The two above embodiments may be combined.

The specific provided antenna structure enables, for a given tuning frequency, to form inductive subassemblies of small value, and thus associated with capacitances of high values (and thus insensitive to the variation of stray capacitances sensitive to the moist environment).

Advantage is thus taken of the dielectric thickness, which enables to form a non-negligible capacitance (greater than 150 pF).

The lengths will then be adapted to the operating frequency of the antenna so that each subassembly respects the tuning, that is, $LC\omega^2 = 1$ ($L54C54\omega^2$ for subassembly 54 according to the embodiment of FIG. 7A and $L54C54/4\omega^2$ for subassembly 54 according to the embodiment of FIG. 8A).

It is possible to use an approximate rule to size the antenna. To achieve this, unit inductance L0 is considered to be equal to the inductance of a winding equivalent to the parallel association of two windings 42 and 44 divided by the squared number of turns (the number of turns common to windings 42 and 44). General capacitance C0 is also considered to be equal to the total capacitance comprised between the tracks of the first level and the tracks of the second level, taking into account the electric permittivity of insulating substrate 46. If n resonant subassemblies are regularly distributed per turn of the winding, the approximate rule to be respected is $L0C0(\omega/n)^2 = 1$ in the first embodiment (FIG. 7) and $L0(C0/4)(\omega/n)^2 = 1$ in the second embodiment (FIG. 8). In the case where the resonant subassemblies take up more than one turn, the number of turns is taken into account. For example, for more than two turns n=1/2 will be selected.

The equivalent impedance of antenna 4 can be deduced from a series connection of impedances Z of each subassembly. The voltage recovered by antenna 4, when placed in a magnetic field, may be calculated according to the load connected to the antenna, considering that a voltage source is inserted in series with its equivalent impedance. The value of this voltage source corresponds to the electromotive force which would be induced by the radio frequency magnetic field in a winding equivalent to the parallel association of windings 42 and 44.

It can be seen that the lengths of the conductive elements and the capacitive values can thus be varied according to the distribution of the subassemblies of one or the other of the embodiments. The values of the capacitive elements are now no longer negligible and the antenna is less sensitive to disturbances due to its environment.

This way of forming an antenna further enables to split the electric circuit and avoids inductive elements having too long a length where the current would not be able to circulate in homogeneous fashion (amplitude and phase). Indeed, the interconnection of the pairs amounts to series-connecting several resonant circuits of same resonance frequency. The lower the values of the circuit inductances, the lower current drifts by stray capacitance effects will be.

The different subassemblies do not necessarily have the same length, provided for each subassembly to respect the resonance relation, possibly with an interposed capacitor.

Capacitors may be interposed between different subassemblies. However, to avoid adversely affecting the thickness, it will be preferred to vary the thickness of substrate 46.

In the embodiment illustrated in FIG. 5, the used thicknesses preferably have the following orders of magnitude:

substrate 46: less than 200 μm;

conductive layers for forming windings 42 and 44: less than 50 μm, for example, 35 μm;

varnish 482 and 484: on the order of a few tens of μm;

film 49: at most a few hundreds of μm, preferably less than 100 μm.

Such thicknesses may vary, but it can be seen that the formed transponder is particularly thin (of a thickness smaller than 1 mm in the preferred embodiment) while being insensitive to variations of the stray capacitances due to the presence of the moist environment.

As a specific embodiment, an antenna such as illustrated in FIG. 5 and adapted to an operation at a 13.56-MHz frequency has been formed on a substrate having a 100-μm thickness with a 42.5-pF/cm$^2$ capacitance, in the form of five rectangular loops on each surface of the substrate with the following characteristics (neglecting length variations between subassemblies):

loop size: approximately 210 mm per 50 mm;

width of the copper tracks arranged on the substrate (1.82 mm);

inductance L0=300 nH;

capacitance C0=1,850 pF, that is C54=185 pF in the first embodiment and C54=370 pF (C54/4=93 pF) in the second embodiment.

The practical forming of the antenna, and thus of the transponder, is within the abilities of those skilled in the art based on the functional indications provided hereabove and by using manufacturing techniques current in the manufacturing of integrated circuits on a thin flexible support. In particular, the forming of the interconnects between levels in the embodiment of FIGS. 5 and 7 may require offsetting the respective ends of the tracks in each of the windings.

Figure 9:
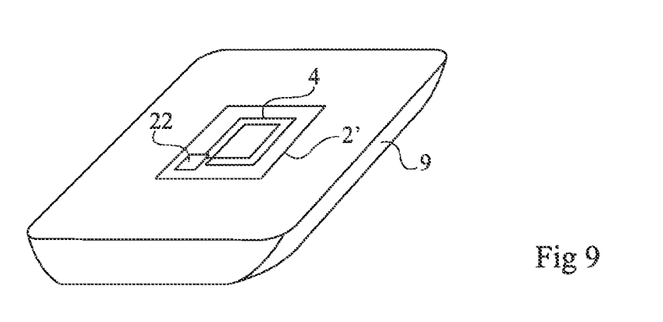
FIG. 9 schematically illustrates another example of application of an antenna according to the present invention.

FIG. 9 illustrates another example of application of an antenna adapted to moist environments. According to this example, an electronic tag 2' comprising such an antenna 4 is arranged on a fresh product packaging (packages may contain different fresh products having various water contents, they may or not be covered with frost, the products thus packaged may be stacked or not, in orderly manner or in bulk).

An advantage of the described structures is that they are compatible in terms of reception of a magnetic flow (and of emission of a magnetic field, considering the current circulating along the antenna) with windings having a large number of turns, preferably between 5 and 15 turns.

Figure 10:
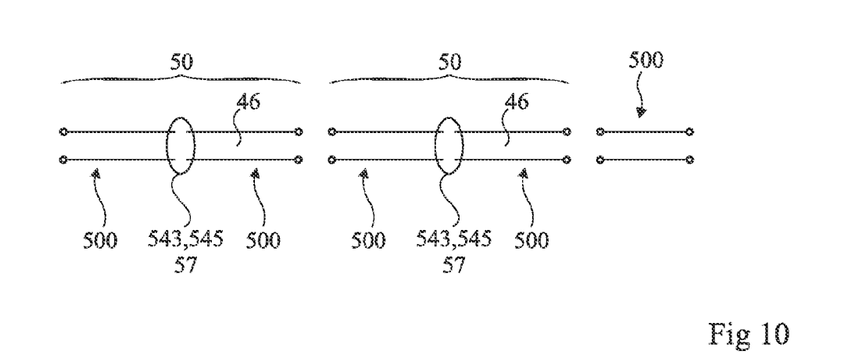
FIG. 10 is a simplified representation of an antenna according to another embodiment.

FIG. 10 is a simplified representation of an antenna according to another embodiment. As in the previous embodiments, the antenna comprises at least two subassemblies 50, each formed of two pairs 500 of tracks coupled to each other by a connection 57 or by connections 543 and 545. This structure is completed by a half-subassembly 500 formed of an additional pair of tracks. It is possible for the half-subassembly to be interposed between two subassemblies rather than being at the end of the antenna. The presence of the additional half-subassembly may be used to adjust the antenna length, to transfer the end terminals of the antenna onto a same surface of the substrate, etc.

As specific embodiments, inductive antennas respecting the described structure have been formed with the following dimensions.

EXAMPLE 1

Substrate: material known under trade name Kapton with a 50-μm thickness ($\in_r$=3.3).

Winding: rectangular spiral of 5 rectangular loops, respectively of 47.5*212 mm, 50.5*215 mm, 53.5*218 mm, 56.5*221 mm, and 59.5*224 mm.

Width of the conductive tracks: 1.07 mm.

Track interruptions: two pairs of tracks per loop (interruptions in the middle of each small side of each loop and middles of the subassemblies in the middle of the large sides).

Type of subassemblies: cross-connection of the type of connections 543 and 545, that is, one end of each first track is electrically connected to one end of a second track of the concerned subassembly. Ten subassemblies as a whole.

EXAMPLE 2

Substrate: material known under trade name Kapton with a 50-μm thickness ($\in_r$=3.3).

Winding: rectangular spiral of 6 rectangular loops, respectively of 47*211.75 mm, 49.5*214.25 mm, 52*216.75 mm, 54.5*219.25 mm, 57*221.75 mm, and 59.5*224.25 mm.

Width of the conductive tracks: 0.89 mm.

Track interruptions: one pair of tracks per loop (interruptions in the middle of each small side of each loop and middles of the subassemblies in the middle of the other small side).

Type of subassemblies: straight connection on a surface of the type of connections 57, that is, one end of each first track is unconnected, the second tracks of each subassembly being interconnected. Six subassemblies as a whole.

EXAMPLE 3

Substrate: material known under trade name FR4 with a 100-μm thickness ($\in_r$=4.8).

Winding: rectangular spiral of 6 rectangular loops, respectively of 20*100 mm, 18*98 mm, 16*96 mm, 14*94 mm, 12*92 mm, and 10*90 mm.

Width of the conductive tracks: 0.66 mm.

Track interruptions: one pair of tracks per batch of two loops (interruptions and middles of the subassemblies in the middle of a same small side of each loop).

Type of subassemblies: cross-connection from one surface to the other.

Other applications of such an antenna and of such a transponder can be envisaged. For example, one or several sensors of physical variables, for example, pressure, temperature, hygrometry, etc. may be connected to the electronic circuit of the transponder, data representative of these variables being transmitted to a distant reader by means of the antenna.

The loop antenna described in document WO 2008/083719 may at most correspond to one of the subassemblies of the described inductive antenna.

Various embodiments have been described, and various alterations and modifications will occur to those skilled in the art. In particular, the dimensions to be given to the conductive tracks depend on the application and their calculation is within the abilities of those skilled in the art based on the functional indications given hereabove and on the resonance frequency and on the desired antenna size.

The invention claimed is:

1. An inductive antenna comprising:
    an insulating substrate;
    a first planar conductive winding on a first surface of the substrate, interrupted at regular intervals to form a series of pairs of first conductive tracks;
    a second planar conductive winding on a second surface of the substrate facing the first winding, the interruptions in the second winding facing the interruptions in the first winding to form a series of pairs of second conductive tracks;
    each pair of first tracks defining, with the facing pair of second tracks, a resonant subassembly;
    two first tracks of a same one of the subassemblies not being interconnected and each being electrically connected to one and only one other first track of only another one of the subassemblies or to a terminal of the antenna;
    the second tracks of neighboring pairs of two neighboring sub-assemblies not being electrically interconnected; and
    one end of each first track being:
        electrically connected to one end of a second track of a given one of the subassemblies; or
        not connected to any conductive element, wherein the second tracks of the given one of the subassemblies being electrically interconnected.

2. The antenna of claim 1, wherein the substrate is flexible.

3. The antenna of claim 1, having a thickness smaller than 1 millimeter.

4. The antenna of claim 1, comprising more than two of the subassemblies.

5. The antenna of claim 1, further comprising a half-subassembly formed of a first track opposite to a second track and coupled to at least one of the subassemblies.

6. A resonator comprising the antenna of claim 1 having interconnected terminals.

7. An electronic tag adapted to moist environments, comprising an electronic circuit connected to an antenna, wherein the antenna is that of claim 1.

8. The electronic tag of claim 7, wherein a matching circuit comprising at least one inductive element and one capacitive element is interposed between the antenna and the electronic circuit.

9. A duct comprising at least one electronic tag of claim 7.

10. A package comprising at least one electronic tag of claim 7.

11. An electromagnetic transponder comprising the tag of claim 7 and a sensor connected to the electronic circuit.

12. A use of the tag of claim 7, in the ground.

13. A duct comprising at least one resonator of claim 6.

14. A package comprising at least one resonator of claim 6.

15. An electromagnetic transponder comprising at least one resonator of claim 5 and a sensor connected to the electronic circuit.

16. Use of the resonator of claim 6 in the ground.

* * * * *